United States Patent Office 2,989,454
Patented June 20, 1961

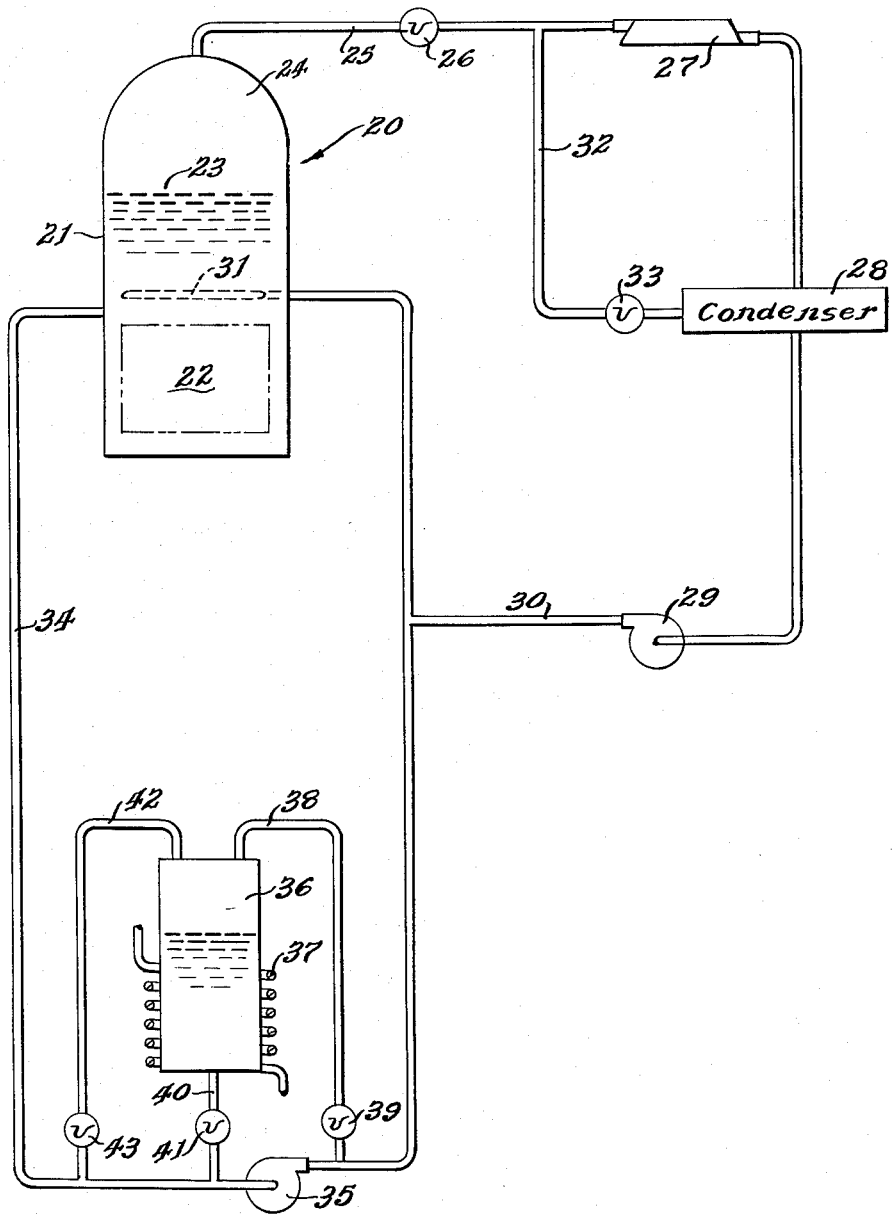

2,989,454
NUCLEAR REACTOR
Calvin R. Breden, La Grange, Ill., and Joseph R. Dietrich, Clearwater, Fla., assignors to the United States of America as represented by the United States Atomic Energy Commission
Filed Aug. 13, 1957, Ser. No. 678,024
3 Claims. (Cl. 204—154.2)

This invention relates to a method of and apparatus for controlling a nuclear reactor. In more detail the invention relates to control of a nuclear reactor by means of a soluble poison distributed in the coolant stream of the reactor.

By a soluble poison is meant a material of high neutron capture cross section which is soluble in the coolant employed in the reactor. The invention is particularly applicable to water-cooled nuclear reactors. As used in the specification and claims the terms "water" and "steam" are intended to cover both light water, $H_2O$, and heavy water, $D_2O$.

Of the three types of control required for operation of a nuclear reactor—safety or scram control, regulating or fine control, and the rough control required for relatively large changes in reactivity known as shim-control— soluble poisons are most suited for safety and shim control. For example, a reservoir of a soluble poison may be maintained adjacent a nuclear reactor under such conditions that the soluble poison will be introduced rapidly into the reactor in an emergency thereby stopping the chain reaction.

Regulating or fine control requires a relatively fast acting means for control which is best served in general by a control rod. On the other hand, the major changes in reactivity in the reactor are slow moving and can be accommodated by slow moving control procedures. It is to this last type of control that this invention relates.

If a nuclear reactor is constructed with only enough reactivity to achieve criticality, operation of the reactor will result in loss of criticality in a short period of time. At the inception of operation, two processes begin which reduce the reactivity of the reactor. The first process is generallly known as "fuel depletion" and signifies the decrease in the number of atoms of thermal neutron fissionable material within the reactor active portion due to fission. The second process occurs simultaneously with fuel depletion and is the process of "poison buildup," this process being the buildup of a fission fragment having a substantial thermal neutron capture cross section as a result of the fission process.

As a result of these two processes, a nuclear reactor must be built with excess reactivity in order to be operated over a prolonged period of time.

This invention applies to control of excess reactivity built into the reactor and to control of reactivity changes during the life of the reactor resulting from fission product poison buildup and decay.

If control elements such as rods are employed to neutralize excess reactivity, these must be sufficient in size and number to provide the necessary control capacity. A large number of control elements complicates the construction of the reactor pressure vessel. The use of soluble poisons serves to eliminate most of the control rods and their channels, thereby affording greater flexibility and freedom in the design of more compact and uniform fuel lattices. The absence of neutron distortion in the control rod regions results in more efficient and economical utilization of fuel and permits operation at higher power levels than would be possible otherwise. In addition, the substitution of solution poison control for the bulk of complex mechanical-electrical controls will result in less expensive control mechanisms and simpler control operation.

It is therefore one of the objects of the present invention to construct a nuclear reactor system including means for introducing and removing a soluble poison from the core of the reactor.

Another object of the present invention is to provide a method of controlling reactivity in a nuclear reactor by varying the amount of a soluble poison dispersed in the coolant.

It is a further object of the present invention to provide a method of operating a nuclear reactor comprising initially injecting a soluble, non-volatile material having a high neutron capture cross section into the coolant to nullify excess reactivity built into the reactor, and removing the material by vaporization of the coolant therefrom and return of the coolant to the reactor as the excess reactivity of the reactor decreases.

The invention will be further described in connection with the accompanying drawing which shows a diagrammatic view of a nuclear reactor power plant including a control system according to the present invention.

In the drawing 20 denotes a boiling-water nuclear reactor. The invention will be described in connection with the boiling-water reactor described in detail in U.S. patent application Serial No. 518,427, filed June 28, 1955, on behalf of Samuel Untermyer, now Patent No. 2,936,273, issued May 10, 1960. This reactor has a complete complement of control rods. The rods employed for shim control are not needed when this invention is employed in connection with the reactor but may be retained as safety controls. A reactor designed for the specific purpose of employing this invention may eliminate many of the control rods.

The reactor 20 comprises a pressure vessel 21 and a core 22. The water level, designated 23, within the pressure vessel 21 leaves room for a steam dome 24 thereabove. A pipe 25 is connected from the pressure vessel 21 through a valve 26 to a turbogenerator 27 which is connected to a condenser 28. The water condensate in the condenser 28 is pumped back into the pressure vessel 21 by a pump 29 through a pipe 30. The water condensate re-enters the pressure vessel 21 and is conducted to a perforated distribution ring 31 which is disposed beneath the surface of the water 23 within the pressure vessel 21, and slightly above the top of the core 22 of the reactor 20. A by-pass pipe 32 containing a valve 33 provides a by-pass around turbogenerator 27.

Thus far we have described a conventional steam circuit for a nuclear reactor. The present invention revolves around the use of a soluble poison circuit including a pipe 34 and a pump 35. In accordance with the present invention, we remove a portion of the coolant from the pressure vessel 21 through pipe 34 by means of pump 35. The coolant is returned to the reactor through pipe 30. An evaporator 36 having the dual functions of acting as storage vessel for poison solution and as concentrator for poison solution is connected into pipe 34 on opposite sides of pump 35. A heater 37 is provided to evaporate the solution contained in vessel 36. A pipe 38 connects the pressure side of the pump 35 with the concentrating vessel 36 and is provided with a valve 37. A second pipe 40 connects the suction side of the pump 35 with the concentrating vessel 36 below the liquid level and is provided with a valve 41. A third pipe 42 connects the suction side of the pump 35 with the concentrating vessel 36 near the top thereof and is provided with a valve 43.

A solution of the poison material is retained in concentrating vessel 36. Concentrating vessel 36 is a 200 liter stainless steel vessel. The solution employed contains 12 grams $B_2O_3$ per 100 cc. of $D_2O$ at 100° C. and 150 liters of this solution are employed.

The poison material found most useful is boric acid. Boric acid is highly suited for the purpose since solutions thereof are extremely stable and do not corrode the materials of construction of the reactor system at the high temperatures employed in some reactors.

Other soluble poisons which are not as satisfactory as boric acid but may find limited application are the soluble compounds of elements of high cross section such as gadolinium, cadmium and samarium. For example, cadmium fluoride, cadmium ammonium fluoride, and the nitrates of the above-mentioned elements have been suggested.

Operation of the system is as follows: Concentrating vessel 36 is heated to a temperature above that of the system water and therefore contains a water phase and a steam phase. Poison is injected into the water employed in cooling the reactor by closing valve 43 and opening valves 39 and 41. The poison solution flows from the tank through valve 41 into the suction side of the pump where it is mixed with the system water and is circulated through the reactor. Concentrating vessel 36 is maintained full of liquid by pipe 38. If the total effect of the poison material is desired the circulation will be permitted to continue till the poison solution is completely mixed with the coolant. However, introduction of poison into the reactor can be cut off at any time by closing valves 39 and 41. Since 515 grams $B_2O_3$ in the core reduce the multiplication factor K for the reactor by .01, a total of 1717 grams $B_2O_3$ are required for the entire circuit to reduce K by this amount. This amounts to $8.6 \times 10^{-5}$ grams/liter. As the stock solution contains approximately 18,000 grams of $B_2O_3$, the control system is effective to compensate for up to .1 excess K.

Removal of poison from the system is accomplished by closing valve 41, opening valve 43 wide and opening valve 39 just sufficient to maintain the solution level in the concentrating vessel. This causes the water to evaporate from the poison solution. The vapor is returned to the coolant stream through pipe 42 and the poison material is concentrated in the concentrating vessel.

The invention may very conveniently be applied to a pressurized water system. In such a system the evaporator is tied in with the high-temperature, high-pressure loop circuit. As in the system described, a small percentage of the flow is by-passed through a concentrating vessel. The top of this vessel is connected to the intake of the circulating pump so that vaporized water is returned to the loop and the poison solution is concentrated in the concentrating vessel. Likewise the bottom of the vessel is connected to the intake of the circulating pump so that the solution in the vessel can be mixed with the water in the loop.

It will be understood that this invention is not to be limited to the details given herein but that it may be modified within the scope of the appended claims.

What is claimed is:

1. In a nuclear power plant including a boiling-water nuclear reactor and a turbogenerator operated thereby, the improvement comprising a pipe exterior to the reactor forming a complete circuit with the reactor, a pump in said pipe for circulating water therethrough, a combined evaporator and storage vessel containing a water solution of a non-volatile soluble material having a high neutron capture cross section, means for heating the said vessel, a pipe containing a valve connecting the vessel with the pressure side of said pump, and separate pipes containing valves connecting the suction side of the pump with the top and bottom respectively of the said vessel.

2. A method of controlling a water-cooled nuclear reactor comprising introducing a water-soluble non-volatile material having a high neutron capture cross section into the reactor to nullify excess reactivity built into the reactor, and controlling the amount of said water-soluble material having a high neutron capture cross section in the water by withdrawing a side stream of the water containing the soluble material having a high neutron capture cross section from the reactor, vaporizing a part of the water content of the side stream in a heated evaporation chamber, returning the liquid phase from the evaporation chamber into the water when it is desired to increase the concentration of material having a high neutron capture cross section therein and returning the vapor phase from the evaporation chamber into the water when it is desired to decrease the concentration of material having a high neutron capture cross section therein.

3. The method of claim 2 wherein the soluble poison material having a high neutron capture cross section is boric acid.

References Cited in the file of this patent

UNITED STATES PATENTS 2,816,068    Ruano    Dec. 10, 1957
2,917,444    Dreffin    Dec. 15, 1949

OTHER REFERENCES

U.S.A.E.C., D.P. 132 (Chemistry), Withers Soluble Neutron Absorbers for Emergency Reactor Shutdown, September 1955, pp. 4, 5.

Zinn et al., Nuclear Sciences and Engineering, vol. 1, October 1956, pages 423, 428, 434–436.

Breden, Brown and Sivety: ANL–5244, (del 2), USAEC report dated Nov. 1955, declassified March 18, 1957, (71 pages); see pages 7, 11, 29, 39, 58. Available on Microcard from USAEC.

Reactor Handbook (AECD–3646), vol. 2, pages 106, 322, 679, published by USAEC (1955).